June 11, 1963  C. FINK  3,093,826
ANTENNA SYSTEM
Filed April 8, 1960
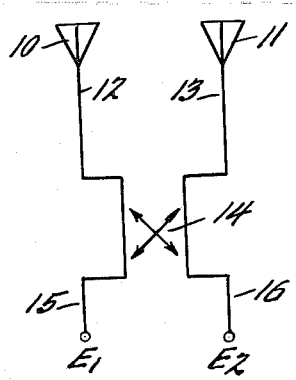
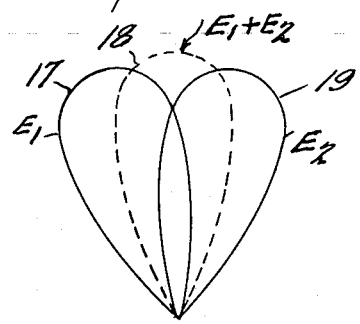
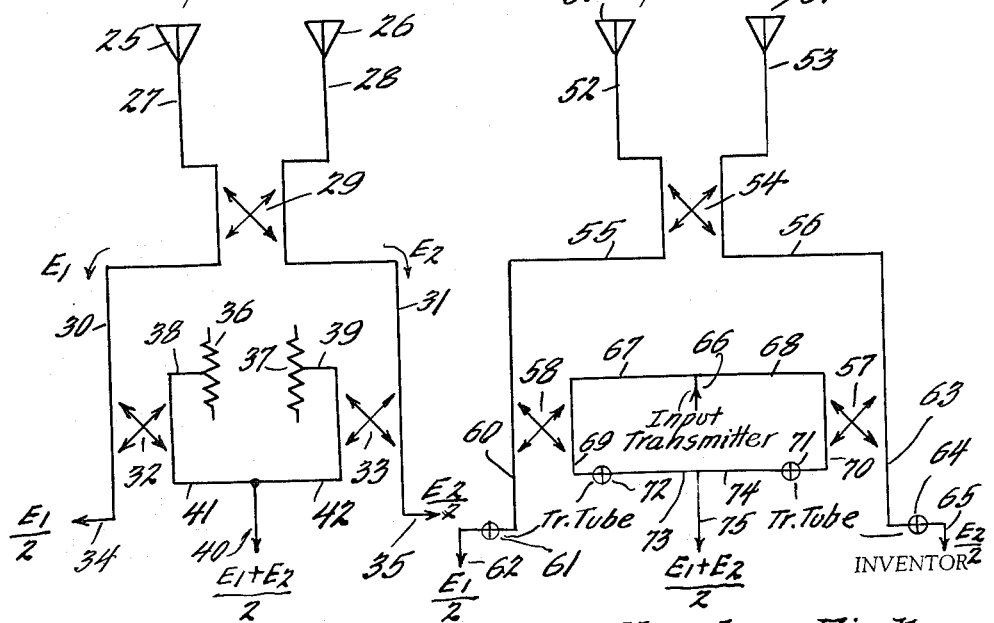
INVENTOR
Charles Fink
BY Alfred B. Levine
Seymour M. Rosenberg
Robert H. Lentz
ATTORNEYS

United States Patent Office 3,093,826
Patented June 11, 1963

---

3,093,826
ANTENNA SYSTEM
Charles Fink, Silver Spring, Md., assignor, by mesne assignments, to Litton Systems, Inc., a corporation of Maryland
Filed Apr. 8, 1960, Ser. No. 20,957
11 Claims. (Cl. 343—100)

This invention generally relates to improvements in multiple lobing antenna systems and is particularly concerned with a two antenna system for providing a single lobe pattern during transmission and a two or three lobe pattern during reception over a broad band of frequencies.

Heretofore, it has been known to employ multiple lobing antenna techniques in radar and like applications for such purposes as determining the position and location of a selected target. In one such two lobe system, a pair of antennae are positioned to observe displaced but overlapping patterns in a space and are sequentially or simultaneously connected to a receiver, enabling the relative position of a desired target to be determined by comparing the different radar echo signals obtained by the two antennae. Various of such systems suffer from a number of disadvantages, included among which are the need for rather elaborate mechanical or electronic switching means, inefficient use of the antenna structure, or special and rather complex antenna structures and designs.

According to the present invention there is provided an antenna system for performing a multiple lobing function that is considerably less complex than known systems and that employs readily available and known components in a new and unique combination. Additionally, there is provided such a system that simultaneously obtains either two or three displaced lobe patterns during reception to provide additional information useful in the locating of targets for radar application as well as for other functions.

It is accordingly a principal object of the invention to provide an improved multiple lobing antenna system.

A further object is to provide such a system employing conventional antenna and other components throughout.

A still further object is to provide a multiple lobing antenna array of greater efficiency.

Other objects and many additional advantages will be more readily comprehended by those skilled in the art after a detailed consideration of the following specification taken with the accompanying drawing, wherein:

FIG. 1 is an electrical schematic drawing illustrating a pair of antenna elements interconnected with receiver lines through a directional coupler means;

FIG. 2 is a general representation of a multiple lobe antenna pattern obtainable from the system of FIG. 1;

FIG. 3 is an electrical schematic of a preferred three lobe antenna receiving system employing the basic system of FIG. 1, and FIG. 4 is a system similar to FIG. 3, but incorporating a modification thereof permitting the system to transmit a single lobe pattern and receive a three lobe pattern.

Referring now to the drawing, and initially to FIG. 1, there is shown a pair of antenna radiating elements 10 and 11 that are spaced apart by a distance that is preferably at least one-quarter wavelength and preferably not greater than one-half wavelength over the bandwidth of frequencies involved. Each of the antennae elements 10 and 11 is fed by a separate line 12 and 13, respectively, which connect with the two output terminals of a directional coupler 14, which is conventionally represented in FIG. 1 as two crossed arrowed lines. The two input terminals of the directional coupler 14 are connected to lines 15 and 16 leading to terminals labeled $E_1$ and $E_2$, respectively.

According to the present invention, the directional coupler 14 is a four-terminal device for reversibly coupling each of the lines 15 and 16 to the antenna feed lines 12 and 13 with equal division of the signal between lines 12 and 13, but with the two signals passing through the coupler 14 being phase displaced from one another.

More specifically, the line 15 is coupled to both lines 12 and 13, and line 16 is likewise coupled to both antenna lines 12 and 13, with the directional coupler 14 providing equal division of about 3 db for all signals from and to lines 15 and 16. As is also characteristic of known directional coupler devices or their equivalent, the signals on antenna lines 12 and 13 are phase shifted from one another by about ninety (90) degrees whereby a signal originating from line 15 is directed to antenna 13 in phase with line 15 but is phase shifted by ninety (90) degrees when directed to line 12, and a signal originating from line 16 is likewise directed to antenna line 12 in an in-phase relationship but phase shifted by ninety (90) degrees when reaching line 13.

With this arrangement of FIG. 1, and presupposing that line 16 is terminated or balanced with a dummy load (not shown) at terminal $E_2$, the lobe pattern being produced by the antenna elements and terminal $E_1$, either during transmission or reception, is tilted to the left from the normal line, as indicated in FIG. 2 by the pattern numbered 17. More specifically, during transmission, as terminal $E_1$ is energized, the antenna lines 12 and 13 are both energized by signals of equal amplitude, but the signal over line 12 is phase delayed by ninety (90) degrees from that over line 13. Consequently, the resulting beam being radiated by antenna elements 10 and 11, is tilted to the left from normal to provide the lobe pattern 17 in FIG. 2. Similarly, if terminal $E_1$ is terminated and terminal $E_2$ is energized, antenna lines 12 and 13 each receive signals of equal amplitude, but in this instance the signal over line 13 is phase delayed by ninety (90) degrees with respect to line 12, whereby the resulting beam pattern being produced by energized antenna elements 10 and 11 is equally tilted to the right as indicated by lobe pattern labeled 19 in FIG. 2 to provide a mirror image of lobe pattern 17, as shown. During reception of energy by antenna elements 10 and 11, the lobe patterns 17 and 19 are, of course, the same as during transmission with terminal $E_1$ exhibiting the pattern 17 and terminal $E_2$ exhibiting the pattern 19.

Considering FIG. 2 in greater detail, it is noted that patterns 17 and 19 are identical switch lobe patterns that are equally tilted or displaced from the normal and exhibit a cross-over level of 3 db below the maximum. Consequently, the sum of lobes 17 and 19 provides a central lobe 18 that is symmetrical about the line normal to the plane of antennae 10 and 11 as is generally indicated by the dotted line lobe pattern 18 in FIG. 2 labeled $E_1+E_2$. This addition or central lobe 18 is, therefore, obtained by connecting terminals $E_1$ and $E_2$ together (not shown) during either transmission or reception. Consequently, with the arrangement of FIG. 1, there is obtained a system capable of transmitting a single lobe pattern 18 (with $E_1$ and $E_2$ being connected together and energized) and receiving a two lobe pattern 17 and 19 ($E_1$ and $E_2$ not being interconnected, and each connected to a separate receiver).

In FIG. 3 there is shown an antenna system capable of simultaneously receiving the three displaced lobe patterns 17, 18, and 19 of FIG. 2. The displaced antenna elements 25 and 26, and the first directional coupler 29 are arranged and connected in the same manner as the elements of FIG. 1, whereby the lines 30 and 31, leading from the directional coupler 29, receive the lobe patterns 17 and 19 as in FIG. 1. Line 30, receiving lobe 17 or $E_1$, is connected to one terminal of a second directional coupler 32 and line 31, receiving lobe 19 or $E_2$, likewise connected to one terminal of a third directional coupler 33. A second terminal of the second directional coupler 32 is connected to an output terminal 34 which may lead to a receiver (not shown) and a second terminal of the third directional coupler 33 likewise is directed to an output terminal 35 which may lead to another receiver (not shown). The second and third directional couplers 32 and 33, each divide the signals from lines 30 and 31 by 3 db, or one-half, but otherwise do not affect the signals (except in phase as previously indicated) whereby the output signal over line 34 has a displaced lobe pattern proportional to lobe 17 or $$\frac{E_1}{2}$$

and the signal over line 35 has a pattern proportional to lobe 19 or $$\frac{E_2}{2}$$

as shown.

A third one of the terminals of the second directional coupler 32 is connected to a dummy or balanced load 36 over line 38 and the remaining terminal thereof is connected over line 41 to a common junction output line 40. In a symmetrical manner, a third terminal of the third directional coupler 33 is connected to a dummy or balanced load 37 over line 39 and the remaining terminal thereof is connected over line 42 to the common junction output line 40.

In operation, the received signal over line 30 (pattern 17) is directed downward and through directional coupler 32 to the output terminal 34 and attenuated by 3 db by the coupler 32. This signal also passes through the coupler 32 to line 41 leading to common output line 40. The dummy load 36 serves to balance the circuit and provide impedance matching whereby the signal being passed over line 41 to the common output line 40 has substantially the same amplitude and lobe pattern as that over output line 34 but is phase shifted therefrom by about ninety (90) degrees. Consequently, the signal over line 41 is proportional to $E_1$ or lobe 17 but phase displaced by ninety (90) degrees. In a similar manner the signal over line 31 passes through the third coupler 33 to produce an output over line 35 proportional to $E_2$ and having the second lobe pattern 19, and it also produces an output signal over line 42 leading to common output line 40 that is also proportional to $E_2$ and with a lobe pattern similar to 19 but being phase displaced by ninety (90) degrees therefrom. Consequently, at the common output line 40 there is provided a common junction or sum of the signals $E_1$ and $E_2$ having lobe patterns equally phase displaced from patterns 17 and 19, whereby the resulting output signal at common output line 40 is proportional to the sum of $E_1$ and $E_2$ and, therefore, has the third or central lobe pattern 18 of FIG. 2. Thus the system of FIG. 3 simultaneously produces three output signals during reception over lines 34, 40, and 35, each having a displaced lobe pattern corresponding to a different one of patterns 17, 18, and 19 of FIG. 2.

In FIG. 4 there is shown an antenna system similar to FIG. 3 but incorporating minor changes to permit transmission of a single lobe pattern, corresponding to pattern 18 in FIG. 2, together with simultaneous reception of three displaced patterns corresponding to lobes 17, 18, and 19. As shown, the system is substantially identical to FIG. 3 and comprises a pair of spaced antenna elements 50 and 51; and three directional couplers 54, 58, and 57 in the same arrangement. However, instead of providing dummy loads on the decoupled arms of the second and third couplers 58 and 57, that terminal of each coupler is connected in common to a transmitter 66; the terminal of coupler 58 being connected over line 67 to the transmitter 66 and the terminal of coupler 57 being likewise connected over line 68 to the transmitter 66. The only other change in this system over that of FIG. 3, is the insertion of conventional TR transmit-receive gas tubes or the like switches in each of the output lines leading to receivers (not shown). Specifically, the insertion of a TR tube 61 in output line 62, the insertion of a TR tube 64 in output line 65, and the insertion of TR tubes 71 and 72 in the lines 74 and 73 leading to common output line 75.

In operation, the system functions during reception in the same manner as does that of FIG. 3 since the lower power signals received by the antenna elements 59 and 51 pass through the tubes 61, 64, 71, and 72 to the output lines 62, 65, and 75 to simultaneously produce the three displaced lobe patterns of FIG. 2. During transmission, the power from transmitter 66 is equally divided over lines 67 and 68 and passes through the directional couplers 57 and 58. However, this larger power occurring during transmission fires all of the TR tubes 61, 72, 71, and 64, preventing the transmitter power from passing over the output lines 62, 75, and 65, and instead this transmitter signal is reflected by the TR tubes so that all the transmitter power appears on lines 55 and 56 and thereby is passed through directional coupler 54 to simultaneously energize the two antenna elements 50 and 51 for radiation of the single lobe pattern 18 of FIG. 2. Thus the system of FIG. 4 provides transmission of energy in a single lobe pattern 18 and obtains three displaced lobe patterns 17, 18, and 19 simultaneously during reception.

As is generally indicated above, the directional coupler means of the present invention are known and available components which serve the function of reversibly and equally dividing the energy passing between the input and output terminals thereof but providing a fixed phase shift. Thus, the energy received at any one input terminal is equally divided and transmitted over both output terminals but the phase of the signal over one output terminal is displaced from that of the other. This feature enables the space displacement of the lobe patterns, and by interconnecting the various couplers and antenna elements as described and illustrated, a two or three lobe pattern during reception and a single lobe pattern during transmission is obtainable. Coupling means other than the directional couplers described may be employed to perform this function as is believed well known to those skilled in the art, as for example, the hybrid junctions commonly referred to as "Rat Races."

One of the major features of the invention is its ability to provide the multiple lobing functions described over a broad bandwidth of frequencies. In fact, the bandwidth obtainable with the systems of FIGS. 3 and 4 is limited only by the operating bandwidth of the components such as the antenna elements and directional couplers. Since these well known and available components are obtainable having operating bandwidths of at least an octave band of frequencies, any given installation of the system described may likewise be operated at any one or more frequencies within the bandwidth without changing the functioning of the system.

Other variations in the system are also considered within the skill of those versed in the art in the light of the present disclosure. For example, variations may be made to introduce the transmitter signal over one of the output lines other than a common line, or over one of the intermediate lines such as 55 and 56 in FIG. 4. With this change, the transmitted lobe pattern is displaced from that of 18 in FIG. 2 and directed at a different angle. Since these and many other changes are considered within the scope of the present invention, this invention is to be considered as being limited only by the following claims.

What is claimed is:

1. In an antenna system for simultaneously obtaining three spaced displaced lobe patterns during reception, a pair of antenna elements displaced apart at least one quarter wavelength, a first four terminal directional coupler having two lead-in and two lead-out terminals, each of said lead-in terminals being connected respectively to a different one of the two antennas, a second four terminal directional coupler having one of its lead-in terminals connected to one of said lead-out terminals of the first coupler, and having one of its lead-out terminals connected to a first output line and a second of its lead-out terminals connected to a common output line and its remaining lead balanced with respect to the common output line, and a third four terminal directional coupler having one of its lead-in terminals connected to the remaining lead-out terminal of the first direction coupler, and having a lead-out terminal connected to a second output line and the other lead-out terminal being connected to the common output line and the remaining lead-in terminal balanced with respect to the common output line, whereby each of said output lines receives a lobe pattern of substantially the same form as that of the other output line that is space displaced from the others, with the lobe pattern being received by the common output line being symmetrical about a line normal to the plane of the antennas and with the lobes received by the first and second of said lines being oppositely angularly displaced from said normal line.

2. In the antenna system of claim 1, means enabling the transmission of a single lobe pattern from said system and the simultaneous reception of said three displaced lobe patterns comprising a switch means connected between said second directional coupler and the first output line, a second switch means connected between said third line and fourth coupler and the second output line, third and fourth switch means, each being connected between the common switch means output terminal and a different one of the lead-out lines from the second and third direction couplers, and means connecting the balanced lead-in lines to the second and third directional couplers to commonly receive a transmitted signal.

3. In the antenna system of claim 2, each said directional coupler equally dividing the signal between its lead-in terminal to both lead-out terminals by substantially one half and providing a fixed phase displacement between said lead-out terminals referenced to the lead-in terminal, whereby during reception the first and second output lines receive out of phase signals from the antenna elements but said common line receives in phase signals therefrom.

4. In an antenna system for producing three displaced simultaneous lobe patterns during reception, a pair of displaced antenna elements, means coupling the signals to and from both the antenna elements from each line of a pair of intermediate lines whereby each element receives and transmits the same proportion of energy over each intermediate line but with the energy over one line being in an out of phase relation with that over the other by a fixed phase displacement, second and third identical coupling means, with the second of said coupling means interconnecting a first output line and a common output line with one of said intermediate lines, and with the third of said coupling means interconnecting a second output line and said common line with the other of said intermediate lines, whereby the signal over said first output line is proportional to that over one of the intermediate lines, the signal over the second output line is proportional to that over the other intermediate line and the signal over the common output line is proportional to the sum of the signals over the pair of intermediate lines.

5. In the antenna system of claim 4, the addition of means for providing a single lobe pattern during transmission, said means comprising a means for coupling energy from a transmission line simultaneously to said second and third coupling means and switch means in each of said first output line, second output line, and common output line responsive to the larger energy during transmission for preventing said energy from passing outwardly over said output lines and instead reflecting said energy back into said second and third coupling means for transmission over said pair of intermediate lines and being non-responsive to lesser energy during reception to enable said reception energy to pass outwardly over the output lines.

6. In the system of claim 5, said switch means in each output line comprising a gas transmit receive tube.

7. In an antenna system, a pair of displaced antenna elements, a pair of intermediate feed lines and three output lines, means reversibly coupling energy from each of said intermediate lines to both elements in substantially equal proportion but in out of phase relation, a second coupling means for reversibly coupling energy from one of said intermediate feed lines to two of said output lines in substantially equal proportion but in out of phase relation, and a third coupling means for reversibly coupling energy in equal proportion but in out of phase relation from the other of said intermediate lines to the remaining output line and to one of the output lines that is also coupled to said second coupling means, said first, second, and third coupling means all providing substantially the same phase displacement, whereby each of said output lines produces a lobe pattern that is space displaced from that being produced by the other output lines.

8. In the antenna system of claim 7, the addition of connecting means for enabling the common energization of said second and third coupling means with a transmission signal thereby to transmit a single lobe pattern from said pair of antenna elements, and switch means in each of said output lines for decoupling said transmission signal from passage over said output lines.

9. In the system of claim 8, said switch means comprising gas tubes responsive to increased power of said transmission signal to decouple said output lines and being unresponsive to lesser power during reception for coupling signals over said output lines.

10. A two lobe monopulse antenna system comprising a pair of displaced antenna elements, a directional coupler means connected to both said elements for coupling energy equally from and to a pair of intermediate lines but in an out-of-phase relationship, with the energy from and to one said intermediate line being coupled equally to both elements in an out-of-phase relationship and the energy from and to the second intermediate line being equally coupled to both elements but in an opposite out-of-phase relationship, whereby during reception each of said intermediate lines receives a lobe pattern signal from both antenna elements that is displaced in space from the other, and means conveying energy from a source commonly to both intermediate lines during transmission, whereby there is propagated from the two antenna elements a single lobe pattern disposed in space centrally between the lobe patterns occurring during reception, the addition of means enabling the production of three displaced lobe patterns during reception and a single lobe pattern during transmission including: a second and third directional coupler means, said second directional coupler means coupling one of said intermediate lines with a first output line and with a common output line, and the third directional coupler means coupling the other of said intermediate lines with a second output line and with said common output line, and means for connecting a transmitter source to commonly energize said second and third coupling means during transmission thereby enabling said transmitter signal to equally energize said intermediate lines.

11. A two lobe monopulse antenna system comprising a pair of displaced antenna elements, a directional coupler means connected to both said elements for coupling energy equally from and to a pair of intermediate lines but in an out-of-phase relationship, with the energy from and to one said intermediate line being coupled equally to both elements in an out-of-phase relationship and the energy from and to the second intermediate line being equally coupled to both elements but in an opposite out-of-phase relationship, whereby during reception each of said intermediate lines receives a lobe pattern signal from both antenna elements that is displaced in space from the other, and means conveying energy from a source commonly to both intermediate lines during transmission, whereby there is propagated from the two antenna elements a single lobe pattern disposed in space centrally between the lobe patterns occurring during reception, the addition of means enabling the production of three displaced lobe patterns during reception and a single lobe pattern during transmission including: a second and third directional coupler means, said second directional coupler means coupling one of said intermediate lines with a first output line and with a common output line, and the third directional coupler means coupling the other of said intermediate lines with a second output line and with said common output line, and means for connecting a transmitter source to commonly energize said second and third coupling means during transmission thereby enabling said transmitter signal to equally energize said intermediate lines, switching means in each of said first output line, second output line, and common output line that is responsive to increased power from said transmitter signal to prevent said transmitter signal from passing over said output lines and instead reflecting said signal back to said second and third coupling means and being unresponsive to decreased power during reception to permit the passage of signals over said output lines.

References Cited in the file of this patent

UNITED STATES PATENTS

| | | |
|---|---|---|
| 2,817,835 | Worthington | Dec. 24, 1957 |
| 2,830,288 | Dicke | Apr. 8, 1958 |
| 2,925,595 | Thourel | Feb. 16, 1960 |
| 2,956,275 | Ashby | Oct. 11, 1960 |

OTHER REFERENCES

IRE Convention Record of 1955, vol. 3, part 8 (pp. 132–134 relied on.)